United States Patent [19]
Park

[11] Patent Number: 5,646,700
[45] Date of Patent: Jul. 8, 1997

[54] SIMULTANEOUS WRITE/READ CONTROL APPARATUS FOR FIRST-IN-FIRST-OUT MEMORY

[75] Inventor: Gi-bok Park, Suwon, Rep. of Korea

[73] Assignee: Samsung Electronics Co., Ltd., Kyungki-Do, Rep. of Korea

[21] Appl. No.: 390,475

[22] Filed: Feb. 17, 1995

[30] Foreign Application Priority Data

Feb. 17, 1994 [KR] Rep. of Korea ................. 94-2793

[51] Int. Cl.⁶ ............................................ H04N 9/64
[52] U.S. Cl. ................................... 348/718; 345/200
[58] Field of Search ............................. 348/714, 715, 348/718, 571, 500, 501, 550; 345/185, 200

[56] References Cited

U.S. PATENT DOCUMENTS

| | | | |
|---|---|---|---|
| 4,386,367 | 5/1983 | Peterson et al. | 348/550 |
| 4,445,135 | 4/1984 | Heitmann et al. | 348/514 |
| 5,124,790 | 6/1992 | Nakayama | 348/571 |
| 5,412,481 | 5/1995 | Ko et al. | 348/571 |
| 5,452,010 | 9/1995 | Doornink | 348/715 |
| 5,530,458 | 6/1996 | Wakasu | 345/200 |

Primary Examiner—Victor R. Kostak
Attorney, Agent, or Firm—Sughrue, Mion, Zinn, Macpeak & Seas

[57] ABSTRACT

A simultaneous write/read control apparatus for a FIFO memory simultaneously controls write and read operations of video data constituting a video frame with an odd field and an even field. A control portion controls the write and read operations of the video data with respect to the FIFO memory and generates a first write enable signal. An unwritten interval signal generator uses information used for controlling the FIFO memory and generates an unwritten interval signal for preventing the video data from being written in the FIFO memory. A second write enable signal generator receives the first write enable signal and the unwritten interval signal from the control portion, and generates a second write enable signal which causes the input video data not to be written in the FIFO memory during an unwritten interval designated by the unwritten interval signal and causes the input video data to be written in the FIFO memory during the other intervals. The second enable signal is supplied to the FIFO memory. Thus, the data reading problems due to the features of the FIFO memory can be solved and the normal picture can be displayed on a screen.

9 Claims, 3 Drawing Sheets

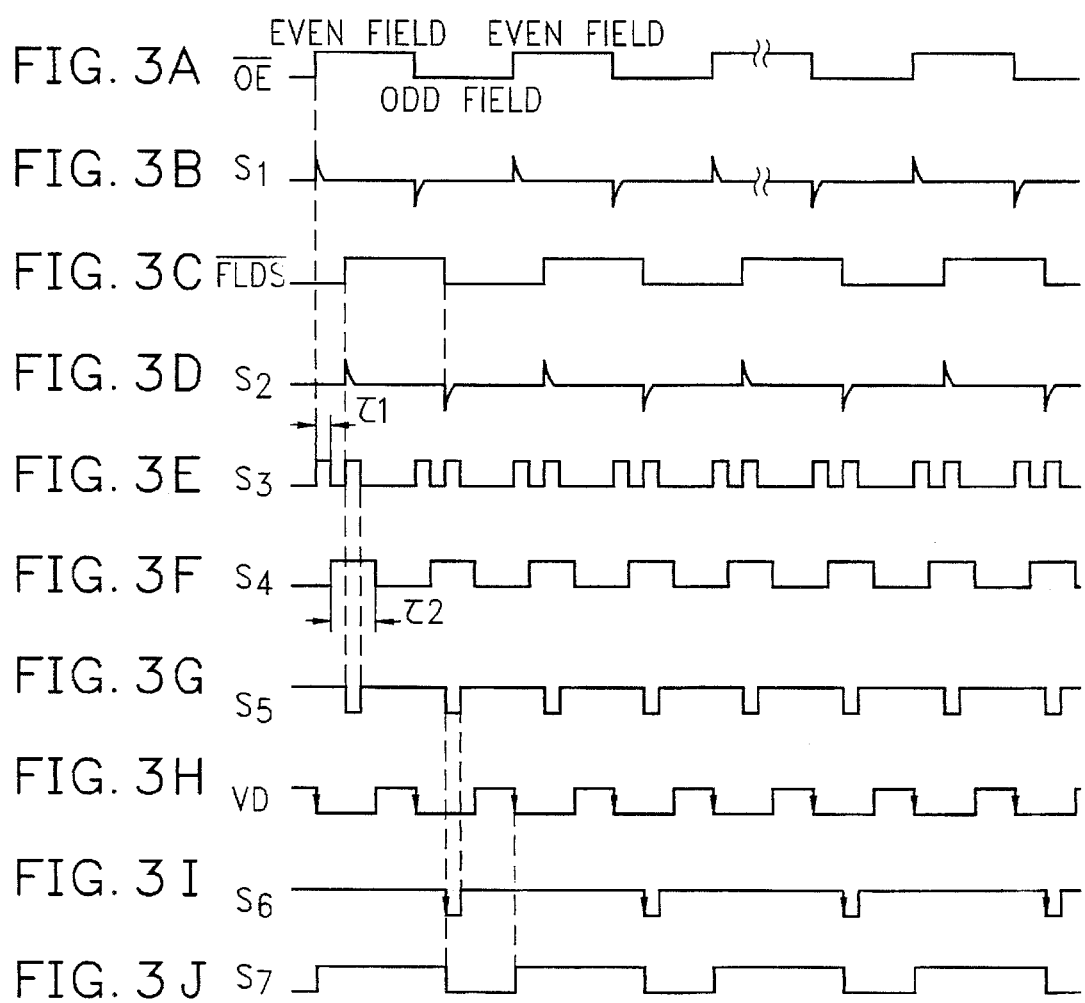

SIMULTANEOUS WRITE/READ CONTROL APPARATUS FOR FIRST-IN-FIRST-OUT MEMORY

BACKGROUND OF THE INVENTION

1. Field of the Invention

The present invention relates to a data input and output control apparatus for a video memory, and particularly to an apparatus for controlling a first-in-first-out (FIFO) memory capable of simultaneously performing write/read operations of video data with respect to the FIFO memory.

2. Description of Related Art

Generally, video processing equipment for use in a closed-circuit television (CCTV) such as a frame switcher, a sequential switcher and a quad unit, uses a FIFO memory and synchronizes an asynchronous video signal. Here, the FIFO memory perfoms a function of a buffer, to thereby store encoded and irregularly input video data and transmit the stored video data at a constant velocity. Accordingly, an overflow or underflow phenomenon does not occur. On the other hand, the FIFO memory used at the receiving ends stores the video data which is transmitted at a constant velocity and outputs the stored video data in response to a predetermined bit so as to be decoded when there is a request for reading. In these cases, a circuit for controlling a read/write operation of the FIFO memory by using control signals in connection with the video data which is currently input to the FIFO memory is required.

FIG. 1 is a schematic block diagram of a conventional circuit for controlling a write operation in a FIFO memory. The FIG. 1 control circuit 10 receives control signals HD, VD, FLDS, OE and CLEAR which relate to the video data currently input to the FIFO memory, and generates a write enable signal WE which is used for writing a video signal constituting a single video frame with two fields in the FIFO memory (not shown). These control signals are synchronized with the system clock, in which HD is a horizontal sync signal for controlling a write system, VD is a vertical sync signal for controlling the write system, FLDS is an odd/even field flag signal for controlling a read system, OE is an odd/even field flag signal for controlling the write system and CLEAR is a signal for clearing control circuit 10. FLDS and OE are signals for discriminating if the input video data is an odd field or an even field, respectively. When control circuit 10 generates write enable signal WE based on input control signals HD, VD, FLDS, OE and CLEAR, and applies the generated write enable signal WE to the FIFO memory, input data is written in the FIFO memory according to a state of a level of write enable signal WE.

However, when the video data is read according to the features of the FIFO memory, such a conventional apparatus may not determine whether the previously written video data should be read or the newly written video data should be read. In this case, a video data mixture of the previously written data with the newly written data is output from the FIFO memory. Thus, when such video data is displayed on a screen, an abnormal picture may be regenerated thereon.

SUMMARY OF THE INVENTION

Therefore, to solve the above problems, it is an object of the present invention to provide an apparatus for controlling a FIFO memory capable of regenerating a normal picture on a screen even in the case that it cannot be determined whether the previously written video data should be read or the newly written video data should be read when the video data is read according to the features of the FIFO memory.

To accomplish the above object of the present invention, there is provided a simultaneous write and read control apparatus, the apparatus comprising:

a first-in-first-out (FIFO) memory having a capacity of storage of one-field video data to control a simultaneous write and read operation of video data constituting a single video frame with an odd field and an even field; control means for controlling write and read operations of the FIFO memory and generating a first write enable signal, using write/read-related control information of the video data having a field flag signal for controlling a write system, a field flag signal for controlling a read system and a vertical sync signal for controlling the write system; means for receiving the field flag signal for controlling the write system, the field flag signal for controlling the read system and the vertical sync signal for controlling the write system and generating an unwritten interval signal for preventing the FIFO memory from storing the video data; and means for receiving the first write enable signal and the unwritten interval signal, and generating a second write enable signal to then apply the generated second write enable signal to the FIFO memory, wherein the input video data is not written in the FIFO memory during an unwritten interval designated by the unwritten interval signal and the former is written in the latter during the other intervals.

BRIEF DESCRIPTION OF THE DRAWINGS

The preferred embodiments are described with reference to the drawings wherein:

FIG. 3A through 3J are timing diagrams of the signals which relate to the FIG. 2 apparatus.

DETAILED DESCRIPTION OF THE PREFERRED EMBODIMENT

A preferred embodiment of the present invention will be described below in more detail with reference to the accompanying drawings—FIGS. 2 and 3A through 31.

Figure 1:
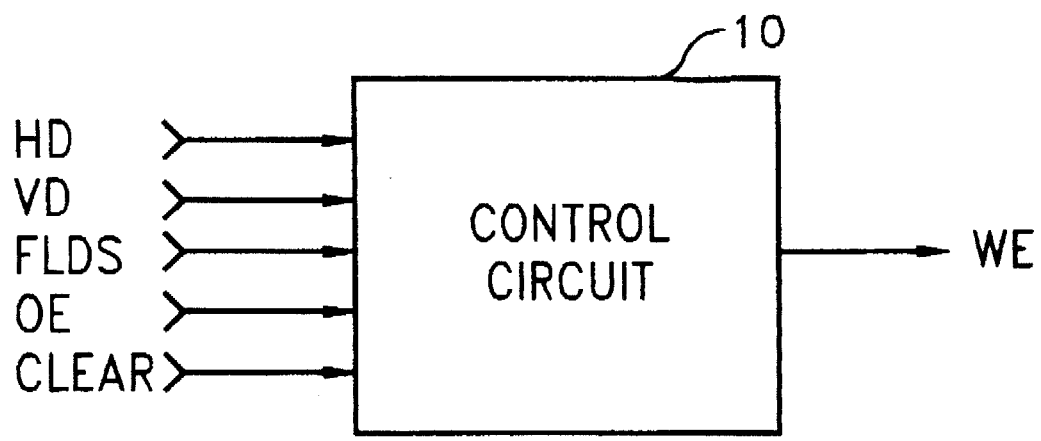
FIG. 1 is a conventional block diagram showing a circuit for controlling an operation of a FIFO memory.
Figure 2:
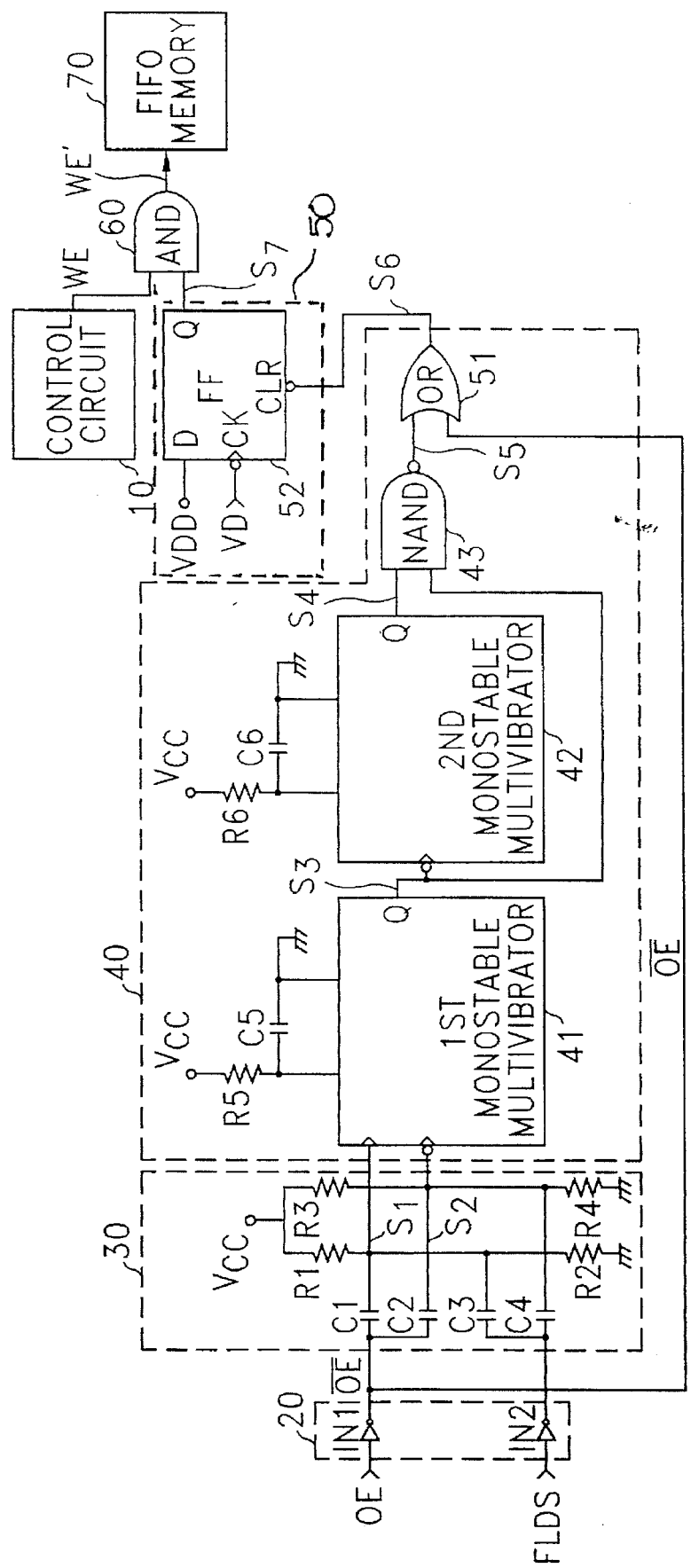
FIG. 2 is a circuit diagram of a simultaneous write/read control apparatus for a FIFO memory according to an embodiment of the present invention.

FIG. 2 shows a control apparatus for preventing a data input and output of the FIFO memory from being mixed according to a preferred embodiment of the present invention. The signals generated by the FIG. 2 apparatus are shown in FIGS. 3A through 3J. In FIG. 2, control circuit 10 is the same as that of the conventional circuit shown in FIG. 1, and receives control signals HD, VD, FLDS, OE and CLEAR to generate write enable signal WE. Write enable signal WE is the same as that generated in control circuit 10 shown in FIG. 1. A signal inverter portion 20 includes a first inverter IN1 which inverts odd/even field flag signal OE for controlling the write system and outputs the inverted signal, and a second inverter IN2 which inverts odd/even field flag signal FLDS for controlling the read system and outputs the inverted signal. The outputs $\overline{OE}$ and $\overline{FLDS}$ of signal inverter portion 20 are supplied to a differentiation circuit 30 including capacitors C1 through C4 and resistors R1 through R4. The output OE is also supplied to an unwritten interval start point detector 40. Differentiation circuit 30 differentiates signals $\overline{OE}$ and $\overline{FLDS}$ which are inverted by inverters IN1 and IN2, respectively. Signals $S_1$ and $S_2$ obtained by the differentiation operations are applied to a first monostable multivibrator 41 in unwritten interval start point detector 40. First monostable multivibrator 41 receives signal $\overline{OE}$ as a rising operation trigger signal, and receives $\overline{FLDS}$ as a falling operation trigger signal, to generate a signal $S_3$. A pulse width $\tau 1$ is determined by a resistor R5 and capacitor C5. The output $S_3$ of first monostable multivibrator 41 is supplied to a second monostable multivibrator 42. Second monostable multivibrator 42 receives signal $S_3$ as a falling operation trigger signal to generate a signal $S_4$. A pulse width $\tau 2$ is determined by a resistor R6 and capacitor C6. A NAND gate 43 receives signals $S_3$ and $S_4$ to generate a signal $S_5$. An OR gate 51 receives output $S_5$ of NAND gate 43 and output $\overline{OE}$ of first inverter IN1 to generate a signal $S_6$. An unwritten region detector 50 includes a D flip-flop 52 which receives output $S_6$ of OR gate 51 via clear end CLR. D flip-flop 52 receives vertical sync signal VD for controlling the write system via clock end CK and a direct current power voltage VDD via signal input end D, respectively. Accordingly, D flip-flop 52 outputs a signal $S_7$ via output end Q. An AND gate 60 receives write enable signal WE from control circuit 10 and signal $S_7$ from unwritten region detector 50, to generate a write enable signal WE' which is applied to FIFO memory 70. FIFO memory 70 has a one-field video data storage capacity.

The operation of the FIG. 2 apparatus having the above construction will be described below with reference to FIGS. 3A through 3J.

Signals OE and FLDS are for discriminating whether the video data is an odd field or an even field. Odd/even field flag signal OE for controlling the write system is for discriminating whether the video data input to the FIFO memory 70 is an odd field or an even field, which is generated by a sync separator (not shown) of a video signal. Odd/even field flag signal FLDS for controlling the read system is for discriminating whether the video data stored in the FIFO memory 70 is an odd field or an even field. If signals OE and FLDS are applied to signal inverter portion 20, signal OE is inverted by first inverter IN1 as a signal $\overline{OE}$ shown in FIG. 3A, and signal FLDS is inverted by second inverter IN2 as a signal $\overline{FLDS}$ shown in FIG. 3C. The high levels of signals $\overline{OE}$ and $\overline{FLDS}$ correspond to the even fields of the video data and the low levels thereof correspond to the odd fields of the video data, respectively. Such inverted signals $\overline{OE}$ and $\overline{FLDS}$ are input and differentiated in differentiation circuit 30, respectively. Differentiation circuit 30 differentiates signal $\overline{OE}$ to generate field write start signal $S_1$ shown in FIG. 3B, and differentiates signal $\overline{FLDS}$ to generate field read start signal $S_2$ shown in FIG. 3D. Here, signal $S_1$ is synchronized with a level shift position of signal $\overline{OE}$, and signal $S_2$ is synchronized with a level shift position of signal $\overline{FLDS}$. A level shift start point of signal $\overline{OE}$ is identical to a write start point of the odd/even field video data in FIFO memory 70, and a level shift start point of signal $\overline{FLDS}$ is identical to a read start point of the odd/even field video data stored in FIFO memory 70. Signals $S_1$ and $S_2$ generated by differentiation circuit 30 are used as the trigger signals of first monostable multivibrator 41 in unwritten interval start point detector 40. First monostable multivibrator 41 receives signals $S_1$ and $S2$ in sequence and generates write and read start signal $S_3$ shown in FIG. 3E. Signal $S_3$ has two continuous high level pulses having a pulse width $\tau 1$ due to a time constant which is determined by resistor R5 and capacitor $\tau C5$. Here, pulse width $\tau 1$ is set to be equal to or less than 8.3 μsec (=120×69.7 nsec) when a period of the write clock pulse in FIFO memory 70 is 69.7 nsec. The value 120 is the number of the write clock pulses having a period of 69.7 nsec. Second monostable multivibrator 42 receives signal $S_3$ as the trigger signal to generate signal $S_4$ shown in FIG. 3F. Signal $S_4$ has a pulse width $\tau 2$ due to a time constant which is determined by resistor R6 and capacitor C6. Pulse width $\tau 2$ is set to be equal to or more than 33 μsec (=(600−12)×69.8 nsec) when a period of the read clock pulse in FIFO memory 70 is 69.8 nsec. Here, the reasons why pulse width $\tau 1$ is set to be equal to or less than 8.3 μsec and pulse width $\tau 2$ is set to be equal to or more than 33 μsec are because the video data mixture of the previously written data with the newly written data is output from FIFO memory 70 within the range of 120 to 660 cycles. NAND gate 43 generates signal $S_5$ shown in FIG. 3G by performing a NAND-operation of signals $S_3$ and $S_4$ output from two monostable multivibrators 41 and 42. Signal $S_5$ indicates a start point where each odd/even field video data begins to be read from FIFO memory 70. OR gate 51 logically sums signal $\overline{OE}$ from first inverter IN1 and signal $S_5$ from NAND gate 43 and generates unwritten interval start signal $S_6$ shown in FIG. 3L. Signal $S_6$ indicates a start point where each odd field video data begins to be read from FIFO memory 70. Signal $S_6$ is applied to a clear end CLR of D flip-flop 52. D flip-flop 52 receives direct current power voltage VDD via data input end D and vertical sync signal VD for controlling write system via clock end CK, respectively. D flip-flop 52 generates unwritten interval signal $S_7$ which causes a level shift by signal $S_6$ applied via clear end CLR and vertical sync signal VD for controlling the write system. Signal $S_7$ indicates a range where the video data input to FIFO memory 70 is not written in FIFO memory 70, and is shown in FIG. 3J. AND gate 60 performs a logical multiplication of write enable signal WE applied from control circuit 10 with signal $S_7$ applied from D flip-flop 52 to generate write enable signal WE'. The input video data is written in FIFO memory 70 when write enable signal WE' is a high level signal, while the input video data is not written in the FIFO memory 70 when write enable signal WE' is a low level signal. Thus, FIFO memory 70 stores the whole even field video data, while FIFO memory 70 does not store the video data corresponding to the interval of time when write enable signal WE' is a low level signal among the odd field video data. The even field video data corresponding to the interval of time when write enable signal WE' is a low level signal is not erased and remains in FIFO memory 70. Thus, the even field video data read from FIFO memory 70 becomes the same data as the even field video data written in FIFO memory 70. On the other hand, the odd field video data read from FIFO memory 70 includes the previous even field video data before one field which remains in FIFO memory 70 by the low level signal of write enable signal WE' and the odd field video data which is written in FIFO memory 70 by the high level signal of write enable signal WE'.

The present invention can control the FIFO memory so as to display a normal picture even in the case that it cannot be determined whether the previously written video data should be read or the newly written video data should be read when the video data is read according to the features of the FIFO memory.

While only certain embodiments of the invention have been specifically described herein, it is apparent that numerous modifications may be made thereto without departing from the spirit and scope of the invention.

What is claimed is:

1. A simultaneous write and read control apparatus comprising:
   a first-in-first-out (FIFO) memory, having a one-field video data storage capacity, to control a simultaneous write and read operation of video data constituting a single video frame with an odd field and an even field;

control means for controlling write and read operations of said FIFO memory and generating a first write enable signal, using write/read-related control information of the video data having a field flag signal for controlling a write system, a field flag signal for controlling a read system and a vertical sync signal for controlling the write system;

means for receiving the field flag signal for controlling the write system, the field flag signal for controlling the read system and the vertical sync signal for controlling the write system and generating an unwritten interval signal for preventing said FIFO memory from storing the video data; and means for receiving the first write enable signal and the unwritten interval signal, and generating a second write enable signal to then apply the generated second write enable signal to said FIFO memory, wherein the input video data is not written in said FIFO memory during an unwritten interval designated by the unwritten interval signal and the input video data is written in the FIFO memory during other intervals.

2. A simultaneous write and read control apparatus, comprising:

a first-in-first-out (FIFO) memory, having a one-field video data storage capacity, to control a simultaneous write and read operation of video data constituting a single video frame with an odd field and an even field;

control means for controlling write and read operations of said FIFO memory and generating a first write enable signal, using write/read-related control information of the video data having a field flag signal for controlling a write system, a field flag signal for controlling a read system and a vertical sync signal for controlling the write system;

means for receiving the field flag signal for controlling the write system, the field flag signal for controlling the read system and the vertical sync signal for controlling the write system and generating an unwritten interval signal for preventing said FIFO memory from storing the video data; and means for receiving the first write enable signal and the unwritten interval signal, and generating a second write enable signal to then apply the generated second write enable signal to said FIFO memory, wherein the input video data is not written in said FIFO memory during an unwritten interval designated by the unwritten interval signal and the input video data is written in the FIFO memory during other intervals;

wherein said unwritten interval signal generating means comprises:

a field start position detector which receives the field flag signal for controlling the write system and the field flag signal for controlling the read system, detects a write start point and a read start of the respective field video data which is written in said FIFO memory and generates a field write start signal and a field read start signal;

a first circuit which receives the field write start signal and the field read start signal from said field start position detector and generates an unwritten interval start signal of the odd field video data; and a second circuit which receives the unwritten interval start signal and generates the unwritten interval signal.

3. A simultaneous write and read control apparatus according to claim 2, wherein said field start position detector comprises:

a signal inverter portion for inverting the field flag signal for controlling the write system and the field flag signal for controlling the read system and outputting the inverted signals;

a first differentiator for differentiating the field flag signal for controlling the write system to generate the field write start signal; and a second differentiator for differentiating the field flag signal for controlling the read system to generate the field read start signal.

4. A simultaneous write and read control apparatus according to claim 3, wherein said first circuit comprises:

a first monostable multivibrator which receives the inverted field write start signal via a rising operation trigger signal input end and the inverted field read start signal via a falling operation trigger signal input end, respectively, and generates a write and read start signal including a first pulse having a pulse width corresponding to a predetermined first time constant and synchronized with the field write start signal and a second pulse having a pulse width corresponding to the first time constant and synchronized with the field read start signal;

a second monostable multivibrator which receives the write and read start signal from said first monostable multivibrator via a falling operation trigger signal input end and generates a first signal having a pulse width corresponding to a predetermined second time constant and synchronized with the low edge signal of the first pulse;

a NAND gate for performing a NAND-operation of the write and read start signal and the first signal and generating a second signal; and an OR gate for performing a logical summation of the second signal of said NAND gate and the inverted field flag signal for controlling the write system and generating the unwritten interval start signal.

5. A simultaneous write and read control apparatus according to claim 4, wherein said second circuit comprises a D flip-flop for receiving a high level power voltage via a signal input end, the vertical sync signal for controlling the write system via the low edge clock end and the unwritten interval start signal via the clear end, respectively, and generating the unwritten interval signal.

6. A simultaneous write and read control apparatus according to claim 5, wherein said second write enable signal generating means comprises an AND gate for receiving the first enable signal and the unwritten interval signal and performing a logical multiplication.

7. A simultaneous write and read control apparatus according to claim 1, wherein said unwritten interval signal is a signal for indicating an interval where it cannot be determined whether previously written data should be read or newly written data should be read.

8. A simultaneous write and read control apparatus according to claim 1, wherein said second enable signal causes the odd field video data not to be written in said FIFO memory.

9. A simultaneous write and read control apparatus according to claim 8, wherein said second enable signal causes the odd field video data corresponding to the unwritten interval started from the read start point of the odd field not to be written in said FIFO memory.

* * * * *